Nov. 20, 1956 G. M. MAST 2,771,013
STEREOSCOPIC CAMERA
Filed Nov. 30, 1953 2 Sheets-Sheet 1

INVENTOR.
GIFFORD M. MAST
BY
Merrill M. Blackburn
ATTORNEY

Nov. 20, 1956   G. M. MAST   2,771,013
STEREOSCOPIC CAMERA
Filed Nov. 30, 1953   2 Sheets-Sheet 2

INVENTOR.
GIFFORD M. MAST
BY
Merrill M. Blackburn
ATTORNEY

United States Patent Office 2,771,013
Patented Nov. 20, 1956

2,771,013
STEREOSCOPIC CAMERA

Gifford M. Mast, Davenport, Iowa, assignor to Mast Development Company, Inc., Davenport, Iowa, a corporation of Iowa Application November 30, 1953, Serial No. 395,015

3 Claims. (Cl. 95—18)

The following invention relates, in general, to cameras, and particularly to cameras for use in stereoscopic photography.

In the ordinary stereoscopic camera, the frame being formed by the edges of the film aperture, a distant object, such as a mountain, several miles away, will have the same relation to the frame of the picture or image in the left eye scene as in the right eye scene. There is thus no parallax in the ordinary stereoscopic camera between the mountain and the frame line and, therefore, the window, through which the scene is viewed, appears at infinity, or at the same distance as the mountain. Because three-dimensional pictures present the scene with such apparent realism, it is essential to provide definite and properly positioned edges to serve as a window through which the scene can be viewed, and it is much more natural to present the window in such a way that the scene is viewed through the window, rather than having the window appear to lie at infinity or at the distance of the mountain, in the example mentioned above. Preferably, the window should be made to appear closer than most, if not all, of the near objects in the scene.

It is, therefore, the principal object of the present invention to provide a camera in which the pictures are properly framed without having to crop the individual pictures after they have been exposed and developed.

More specifically, it is a feature of the present invention to provide a stereoscopic camera in which provision is made for shifting the film and film apertures relative to the respective axes of the associated lenses, whereby the frame or window of the picture may be made to appear as close to or as far away as desired.

These and other objects and advantages of the present invention will be apparent to those skilled in the art after a consideration of the following description of the preferred structure, incorporating the principles of this invention, illustrated in the accompanying drawings, in which.

Figure 1:
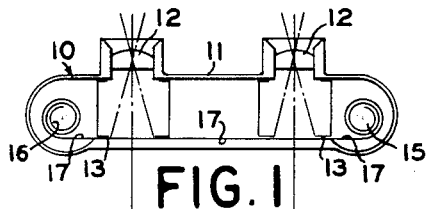
Fig. 1 is a diagrammatic view of a conventional stereoscopic camera.

The principles of the present invention can best be understood by a discussion, first, of an ordinary stereoscopic camera and the principles underlying the same.

Referring, first, to Figs. 1 to 5, inclusive, the camera is shown at 10 and includes a casing 11, a pair of matched lenses 12, means forming an associated pair of film apertures 13 arranged symmetrically relative to the axes of the respective lenses 12, and film carriers 15 and 16. The film is shown at 17. The camera 10 takes two pictures, and each picture is top for bottom and left for right, as shown symbolically by the inverted L and R, $L^1$ and $R^1$, $L^2$ and $R^2$, et cetera in Fig. 2, wherein R indicates the right eye image and L indicates the left eye image, and wherein the film is shown as viewed from the back, the side away from the emulsion.

Figure 2:
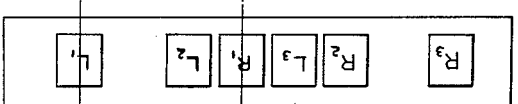
Fig. 2 is a diagrammatic view of the film after exposure in the camera of Fig. 1.
Figure 3:
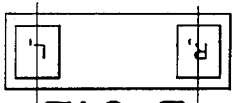
Fig. 3 is a diagrammatic view of a contact print from the film of Fig. 2, emulsion to emulsion.
Figure 4:
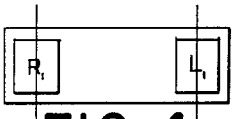
Fig. 4 shows the print of Fig. 3 turned over and rotated end for end.
Figure 5:
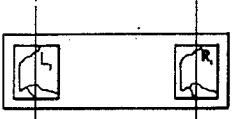
Fig. 5 shows the pictures cut from the film strip, separated and transposed for viewing, as by being mounted on a cardboard mount.

If a normal, i. e., emulsion to emulsion, contact print is made from the film of Fig. 2, the print will be as shown in Fig. 3, considering only the pictures $L^1$ and $R^1$. Turned one hundred and eighty degrees (180°), the print will be as shown in Fig. 4, but the right eye image will be on the left side and the left eye image will be on the right side. To correct this situation, the pictures are cut apart and transposed as in Fig. 5. If the film is of reversal stock, as the presently conventional color film, the original film is viewed, instead of a print. The viewed film will be exactly equivalent to Figs. 3 to 5, except that the emulsion will be away from the eye.

In viewing a stereoscopic picture, either projected or with a viewer, the effect is that of looking through a window upon the scene. The position of the window may be either near or far from the viewer, but in general, the foreground material of the picture should, for the best effect, be beyond the window. A good rule is that any object in the picture that is cut by the frame line of the picture should be beyond the window, but objects may project through to the near side of the window. For example, with a flower picture, the stem and foliage which are cut by the frame line should be beyond the window, while the flower itself may project through the window and be nearer than the window.

Figure 8:
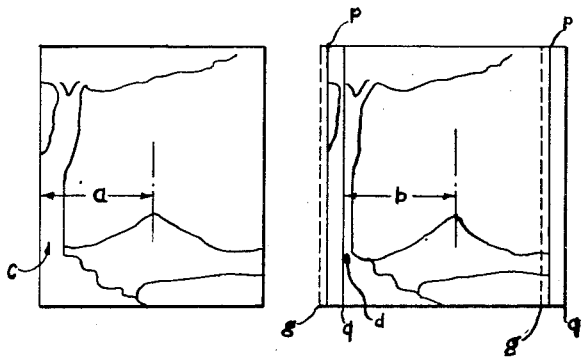
Fig. 8 is a view similar to that of Fig. 7, showing, diagrammatically, the images formed and the shift of the film apertures relative to the principal axes of the respective lenses, that is, relative to the images formed by the respective lenses.

In Fig. 8, I have shown, in left and right hand pictures, a distant mountain and a nearby tree, as taken with an ordinary stereoscopic camera. The distant object, the mountain, will have the same relation to the frame $q$—$q$ in both the left and right eye scenes. That is, the distance $a$ and $b$ will be equal. There is thus no parallax between the mountain and the frame line, and the window appears at infinity, i. e., the distance of the mountain. Since the tree is closer to the camera, the image of the tree will be shifted with respect to the frame line so that the distance $d$ in the right eye scene will be less than the distance $c$ in the left eye scene. To place the window at the distance of the tree, the cropping of the picture must be changed so that $c$ equals $d$. Hence the frame lines must be moved from $q$—$q$ in the right eye scene over to $p$—$p$. For the best effect, the window will be placed somewhat closer than the tree so that the foliage and the tree base will all appear beyond the window. This requires changing the cropping to move the frame lines even farther, as to $g$—$g$.

As mentioned above, it is one feature of this invention to provide means for properly framing the pictures without having to crop the individual pictures, and, further, to make it possible to change the apparent position of the "window" when desirable or necessary to secure the effect desired.

Figure 6:
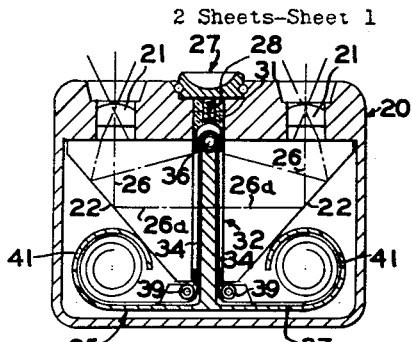
Fig. 6 is a horizontal sectional view of a camera in which the principles of the present invention have been incorporated.

In Fig. 6, the camera incorporating the principles of this invention includes a casing 20 carrying a pair of lenses 21 spaced apart the proper interocular distance. A pair of reflecting means, such as mirrors 22, prisms, or the like, is mounted fixedly in the casing 20 in any suitable manner. An approximately T-shaped member 25 is mounted for shifting movement by any suitable means, not shown, in the casing 20 relative to and in a direction parallel to the principal axes 26 of the lenses 21. A rotatable thumb screw 27 is rotatably mounted in the front part of the casing 20 and carries a threaded shank 28 which engages in a tapped opening formed in the forward end portion 31 of the T-shaped member 25. The shank section 32 of the latter is formed with slotted apertures 34 which receive the film F, and in a front vertical opening is located a forward guide roller 36 over which the film F passes. The edges of the slotted apertures 34 define the margins of the pictures or images. The rear part of the shank section 32 is joined to the middle of a film-carrying cross-section 37 and, adjacent this junction, a pair of rollers 39 receive and guide the film F. The end portions of the film-carrying cross-section 37 are formed, as at 41, to receive the usual film spools, cartridges, or the like.

Figure 9:
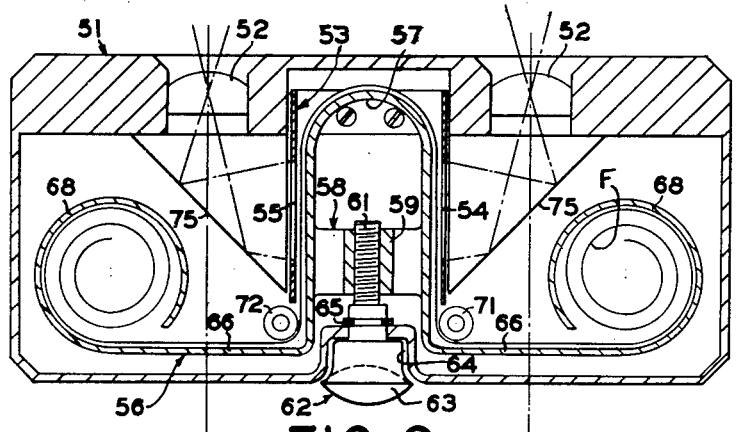
Fig. 9 shows a modified form of the present camera, especially adapted for 35 mm. film.

A modified form of the present invention is shown in Fig. 9, this form being especially adapted to handle miniature film, such as 35 mm. film. This form of the present invention is illustrated as embodied in a camera which includes a casing 51, a pair of matched lenses 52, a shell 53 formed with a pair of film apertures 54 and 55, and a film carrier 56 having a forward curved section 57 and, rearwardly thereof, a spider 58 which is provided with a threaded hub portion 59 receiving the threaded shank 61 of an adjusting screw 62. The latter member has a thumb piece 63 rotatably seated in a recess 64 in the back of the casing 51, and the adjusting screw 62 is held in place by a snap ring 65, or other suitable means. The shell 53 with the film apertures 54 and 55, move with the film carrier 56, as in the previously described form. The film carrier also includes a transverse section 66 which carries, or is formed with, a pair of film cartridge receivers 68. The film, indicated at F, passes from one cartridge around a guide roller 71 and then past the associated film aperture 54, around the curved section 57, past the other film aperture, over the other guide roller 72, and then to the other film cartridge. Fixedly carried in the casing 51 is a pair of mirrors 75 set substantially forty-five degrees (45°) relative to the axes of the lenses 52.

Operation

When it is desired to take a picture with the "window" appearing at infinity, as illustrated in Figs. 1 to 8 of the present application, the rotatable thumb screw or adjusting member 27 is turned to move the T-shaped member 25, carrying the film F, the guide rollers 36 and 39, and the film apertures 34, until the film apertures 34 are symmetrically positioned about the reflected axes 26a of the lenses 21. Generally, however, as pointed out above, it is more desirable to have the "window" apear at some nearer position, and this result is secured, according to the principles of the present invention, without cropping, or the like. All that is necessary to do is to move the T-shaped member 25, as by turning the thumb screw or adjusting member 27, forwardly relative to the lenses 21 and the mirrors 22, or other reflecting means, thus moving the film apertures 34 and the film relative to the images formed by the two lenses. This movement is represented in Fig. 8 as moving relative to the image from $q$–$q$ through $p$–$p$ to $g$–$g$ relative to the image. I have determined that the amount of forward advance is approximately by the following formula:

$$\text{Advance} = \frac{D}{m/2} \times f$$

wherein

D is the distance from the camera to the desired position of the window $m$ is the separation of the camera lenses $f$ is the focal length of the camera lens, it being assumed that $f$ is small relative to D.

Figure 7:
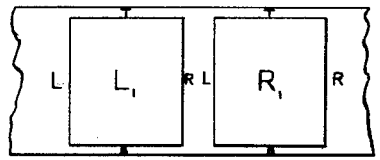
Fig. 7 is a diagrammatic view of film after exposure in such a camera as that viewed in Fig. 6, with the emulsion on the near side.

Another advantage of this invention is that, since mirror images are made on the film, transposition of the images for viewing is not necessary, since, as shown in Fig. 7, the images are already in correct orientation. When prints are made from negatives prepared in the camera described above, they must be made with the emulsion side of the negative away from, instead of in contact with, the print material, but this can be done without loss of definition if a collimated light is used instead of diffused light.

Another advantage of a camera constructed according to the principles of the present invention is that it can readily be designed to have an exaggerated, that is, larger than normal, interocular spacing of the lenses, to heighten the stereoscopic effect in the pictures. because the use of the mirrors, 22 or 75, makes it possible to place the lenses farther apart for a given picture spacing than would be possible in a construction not using mirrors.

The operation of the form of this invention as shown in Fig. 9 is substantially the same as that of the form of the invention shown in Fig. 6. The position of the frame or "window," formed by the edges of the film apertures 54 and 55 on the film, relative to the images formed by the lenses 52, may be moved or adjusted by turning the thumb screw 63. As in the form of the invention shown in Fig. 6, when the distance on the film between the two frames or "windows" is the same as the interocular distance between the two lenses, the "window" will appear to lie at infinity in the viewed or projected picture, but the "window" may be brought to a closer position, as viewed or projected stereoscopically, by moving the film carrier 66 rearwardly in the camera, thus reducing the distance on the film between frames.

Figure 10:
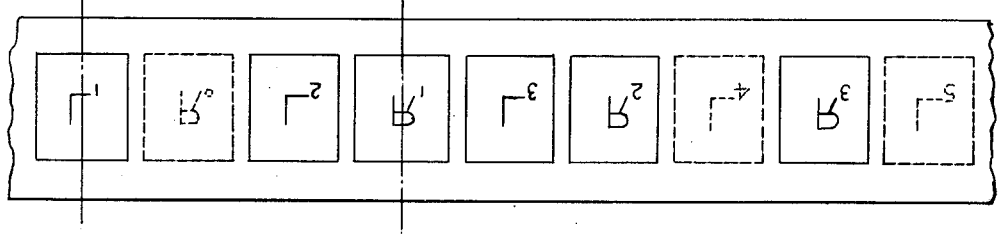
Fig. 10 is a diagrammatic view of the film exposed in the camera as shown in Fig. 9.

Preferably, for the 35 mm. camera film, the construction of the camera is such that, as shown in Fig. 10, there are two picture spaces between each stereoscopic pair. Due, however, to the reversal produced by the mirrors 75, no transportation of the right and left pictures is necessary.

It is of course understood that the specific description of structure set forth above may be departed from without departing from the spirit of this invention as disclosed in this specification and as defined by the appended claims.

Having now described my invention, I claim:

1. In a stereoscopic camera, a casing, a pair of lenses carried thereby in relatively fixed interocular spacing, a film carrier including a forwardly extending section lying between the axes of said lenses, means guiding a film around said section, shield means forming a pair of film apertures carried by the film carrier and lying closely adjacent the film at opposite sides of said forwardly extending carrier section, means lying behind said lenses and reflecting the images formed by the respective lenses upon the film behind said film apertures, and means for moving the film carrier and shield means in a direction substantially parallel to said forwardly extending carrier section to move the film and film apertures relative to the reflected axes of the pair of lenses.

2. In a stereoscopic camera, a casing, a lens system including a pair of lenses arranged with their axes substantially parallel, image-reflecting means carried by the casing for reflecting the images formed by said lenses laterally through approximately ninety degrees (90°) toward one another, a film carrier including a forwardly extending section lying at right angles to the axes of said reflected images, means in said casing forming film apertures on opposite sides of said carrier section and defining the edges of the images formed on said film, an adjusting member carried by said casing, and means connected with said adjusting member and with both of said film carrier and film aperture means for producing movement in the spatial relationship along the film between the images formed on the film by said lenses.

3. In a stereoscopic camera, a casing, a lens system including a pair of lenses arranged with their axes substantially parallel, image reflecting means carried by the casing for reflecting the images formed by the lenses laterally through approximately ninety degrees (90°) toward each other, a film carrier including a forwardly extending section lying at right angles to the axes of said reflected images, means attached to said carrier and forming apertures in opposite sides of said carrier and defining the edges of the images formed on film supported by said carrier, and an adjusting means connecting said carrier to said casing and capable of producing movement of said carrier with respect to said casing in a direction substantially parallel with the axes of the lenses.

References Cited in the file of this patent

UNITED STATES PATENTS

| | | |
|---|---|---|
| 1,515,428 | Bouin | Nov. 11, 1924 |
| 2,298,586 | Phillips | Oct. 13, 1942 |
| 2,566,110 | Backus | Aug. 28, 1951 |